(12) United States Patent
Hoberman et al.

(10) Patent No.: US 9,779,445 B1
(45) Date of Patent: Oct. 3, 2017

(54) PROCUREMENT SYSTEMS AND METHODS

(75) Inventors: Gary Hoberman, Merrick, NY (US); Kyung Bae, Kinnelon, NJ (US); Jason Gelinas, Jersey City, NJ (US); Francis Donohue, Rush (IE)

(73) Assignee: Citibank, N.A., New York, NY (US)

( * ) Notice: Subject to any disclaimer, the term of this patent is extended or adjusted under 35 U.S.C. 154(b) by 493 days.

(21) Appl. No.: 12/469,836

(22) Filed: May 21, 2009

(51) Int. Cl.
  *G06Q 30/06* (2012.01)
  *G06Q 10/10* (2012.01)
  *G06F 21/10* (2013.01)
  *G06F 17/30* (2006.01)

(52) U.S. Cl.
  CPC ......... *G06Q 30/0637* (2013.01); *G06Q 10/10* (2013.01); *G06F 17/30* (2013.01); *G06F 21/10* (2013.01)

(58) Field of Classification Search
  CPC ........... G06Q 30/0603; G06Q 30/0605; G06Q 30/0629; G06Q 30/0633; G06Q 30/0635; G06Q 30/0643; G06Q 10/06; G06Q 10/087; G06Q 30/0623; G06Q 30/0625; G06Q 30/0631; G06Q 30/0641; G06Q 30/06; G06Q 10/06311; G06Q 10/10; G06Q 10/06315; G06Q 10/0631; G06Q 30/0637; G06F 21/10; G06F 21/105; Y10S 707/948
  USPC ..................................... 705/26.8–26.82, 26.1
  See application file for complete search history.

(56) References Cited

U.S. PATENT DOCUMENTS

| | | | | |
|---|---|---|---|---|
| 5,319,542 A | * | 6/1994 | King et al. .................. | 705/26.81 |
| 5,870,717 A | * | 2/1999 | Wiecha .............. | G06Q 30/0601 235/385 |
| 5,970,475 A | * | 10/1999 | Barnes et al. ............. | 705/26.35 |
| 6,910,018 B1 | * | 6/2005 | Okada .................... | G06Q 30/02 705/26.2 |
| 6,928,441 B2 | * | 8/2005 | Haegele ...................... | 705/26.8 |
| 7,013,290 B2 | * | 3/2006 | Ananian .................... | 705/26.42 |
| 7,082,408 B1 | * | 7/2006 | Baumann ............. | G06Q 10/087 700/236 |

(Continued)

OTHER PUBLICATIONS https://web.archive.org/web/20080308193631/http://www.noosh.com/.*

(Continued)

*Primary Examiner* — F. Zeender
*Assistant Examiner* — Dana Amsdell
(74) *Attorney, Agent, or Firm* — Eric L. Sophir; Dentons US LLP

(57) ABSTRACT

Exemplary methods and systems herein provide a central marketplace for a requestor to request a product or service from an internal inventory or external vendor, receive approval for the request, and have the approved request fulfilled. In one embodiment, a computer-implemented method comprises method for requesting a product or service comprises presenting, by a computer, a catalog to a graphical user interface of a requestor of a corporate entity, wherein the catalog comprises a product or service selected from a database storing records for an internal inventory of the corporate entity and a plurality of databases affiliated with external vendors that are not a parent, subsidiary, or related to the corporate entity; and receiving, by a computer, a selection from the requestor of a product or service of the catalog. The catalog can be synchronized in real-time or periodically with the external vendors' products and services.

23 Claims, 11 Drawing Sheets

(56) References Cited

U.S. PATENT DOCUMENTS

| | | | |
|---|---|---|---|
| 7,113,920 B1* | 9/2006 | Brisiel | G06Q 30/02 |
| | | | 705/26.1 |
| 7,680,696 B1* | 3/2010 | Murray | 705/26.4 |
| 7,747,475 B1* | 6/2010 | Bowman et al. | 705/26 |
| 7,870,038 B1* | 1/2011 | Hammond | G06Q 10/06 |
| | | | 705/26.1 |
| 8,359,245 B1* | 1/2013 | Ballero et al. | 705/27.1 |
| 2001/0039519 A1* | 11/2001 | Richards | G06Q 30/02 |
| | | | 705/7.35 |
| 2002/0065736 A1* | 5/2002 | Willner et al. | 705/26 |
| 2002/0103721 A1* | 8/2002 | Wiesehuegel et al. | 705/27 |
| 2002/0156695 A1* | 10/2002 | Edwards | 705/26 |
| 2003/0041125 A1* | 2/2003 | Salomon | 709/220 |
| 2003/0084104 A1* | 5/2003 | Salem et al. | 709/205 |
| 2003/0105679 A1* | 6/2003 | Krishnan et al. | 705/27 |
| 2003/0149798 A1* | 8/2003 | Klatt | G06Q 30/02 |
| | | | 719/318 |
| 2003/0177070 A1* | 9/2003 | Viswanath et al. | 705/26 |
| 2005/0060324 A1* | 3/2005 | Johnson | G06Q 30/06 |
| 2005/0193029 A1* | 9/2005 | Rom et al. | 707/200 |
| 2006/0080257 A1* | 4/2006 | Vaughan et al. | 705/51 |
| 2006/0184383 A1* | 8/2006 | Davis et al. | 705/1 |
| 2006/0287950 A1* | 12/2006 | Steinberg et al. | 705/39 |
| 2007/0185775 A1* | 8/2007 | Lawton | 705/26 |
| 2007/0233575 A1* | 10/2007 | Berger et al. | 705/26 |
| 2007/0282882 A1* | 12/2007 | Agarwal et al. | 707/101 |
| 2007/0299817 A1* | 12/2007 | Mathew et al. | 707/3 |
| 2008/0021838 A1* | 1/2008 | Wardaschka | G06F 21/10 |
| | | | 705/59 |
| 2008/0027830 A1* | 1/2008 | Johnson et al. | 705/27 |
| 2008/0046298 A1* | 2/2008 | Ben-Yehuda et al. | 705/6 |
| 2008/0052138 A1* | 2/2008 | Marsh et al. | 705/7 |
| 2010/0023425 A1* | 1/2010 | Price et al. | 705/27 |
| 2010/0161345 A1* | 6/2010 | Cain et al. | 705/2 |

OTHER PUBLICATIONS https://web.archive.org/web/20080602065842/http://www.spendmap.com:80/page.asp?intNodeID=918&intPageID=985.* https://web.archive.org/web/20080602065837/http://www.spendmap.com:80/page.asp?intNodeID=917ƒ PageID=982.*

* cited by examiner

FIG. 10

PROCUREMENT SYSTEMS AND METHODS

FIELD OF THE INVENTION

The invention relates generally to systems and methods for procuring products and services.

BACKGROUND

In conventional systems for provisioning and procurement of products and services, a company employee acts as a consumer or buyer to purchase directly from a supplier or through a reseller of the supplier. The company negotiates an agreement with the supplier or reseller and institutes the policy for each purchase. In one example, in order to procure a product from a reseller, a company employee completes a purchase order and provides the purchase order to one or more other entities at the company for approval. Upon approval, the purchase order is delivered to the reseller. The reseller processes the purchase order, provides the goods or services, and sends an invoice to the company. Once the invoice has been received and reviewed, the company pays the reseller.

The conventional systems suffer from a variety of drawbacks. For example, the approval process can be very time consuming. The employee may need to investigate the status of the approval, which can require sending faxes, placing phone calls, sending e-mails, or a combination of these efforts. Also, it may be difficult to track down a particular approving entity in a large organization to request approval or obtain a status. Finally, the approver might also have the same problems when attempting to find the formal request due to inefficiencies in the paper trail.

Another drawback to the conventional systems is that the process can be confusing and time-consuming, even if the procurement is for products or services that are commonly ordered at the same time or periodically. For example, when a new employee is hired, the company procures a collection of products or services for that new employee. For each new employee, however, the company must submit the purchase orders and proceed with tracking the requests for approval. Though the frequency of similar orders is high, absence of a checklist or validated procedure tend to unnecessarily increase input error rates.

When procuring products or services, some products or services are available from outside vendors, whereas others may already be available, e.g., from a storage facility or inventory of the company. Nevertheless, the company employee completes a purchase order form for each desired product or service, and the company must ascertain which of those products or services may be available internally.

Some purchase order forms can cause a delay in procurement. If the form is completed incorrectly, the process must start over. Because the purchase orders are not always user-friendly, the company employee may be required to resubmit the purchase order numerous times until it is properly completed.

In one attempt to streamline the purchasing process, some companies use a "punchout" procedure. When a company employee wants to purchase a product from a vendor, the employee clicks on a hyperlink at the company's intranet website. The hyperlink directs the employee to a micro-site of the vendor's website that is configured for employees. Each "punchout" directs the employee to a single vendor, which can add to the time consuming process of purchasing multiple products or services from multiple vendors. Additionally, the use of punchouts does not allow a user to compare prices or integrate the system into internal overhead costs.

SUMMARY OF THE INVENTION

Various embodiments described herein attempt to overcome the drawbacks of the conventional procurement systems.

In one exemplary embodiment, a computer-implemented method for requesting a product or service comprises presenting, by a computer, a catalog to a graphical user interface of a requestor of a corporate entity, wherein the catalog comprises a product or service selected from a database storing records for an internal inventory of the corporate entity and a plurality of databases affiliated with external vendors; and receiving, by a computer, a selection from the requestor of a product or service of the catalog.

In another exemplary embodiment, a system comprises a product management component for generating a catalog of an available product or service; a request management component for receiving requests from a requestor for the available product or service from the catalog; an approval component for providing approval requests to and receiving approval confirmations from an approving party for the requestor to obtain the requested product or service from the catalog; and a fulfillment component configured for procuring the product or service for the requestor upon receiving the approval confirmation from the approving party.

In yet another exemplary embodiment, a computer-implemented method comprises maintaining, in a computer database, a catalog of an available product or service from an internal inventory database or a plurality of external vendor databases; receiving requests from a requestor's computer for the available product or service from the catalog; submitting, if required for the requested product or service, approval requests to an approving party's computing device for the requestor to obtain the requested product or service from the catalog; if an approval request was submitted, receiving an approval confirmation from the approving party for the requestor to obtain the requested product or service from the catalog; and acquiring the product or service for the requestor from the internal inventory or from an external vendor.

In another exemplary embodiment, a computer-implemented method comprises presenting, to a user by a computer, all available products or services from a catalog; receiving a selection of the user of one or more available products or service from the catalog; submitting, to an approver by a computer, any requested available products or services that require approval for procurement; receiving confirmation by the approver for any requested available products or services for any requested products or services that require approval; and checking, by a fourth computer, whether the requested available products or services are in internal inventory. If the request is for a product or service is in internal inventory, then the product or service is acquired from the internal inventory. If the product or service is not in internal inventory, then the product or service is acquired from an external vendor Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures:

FIG. 10 shows a shopping list user interface according to an exemplary embodiment.

DETAILED DESCRIPTION

Reference will now be made in detail to the preferred embodiments of the present invention, examples of which are illustrated in the accompanying drawings.

Figure 1:
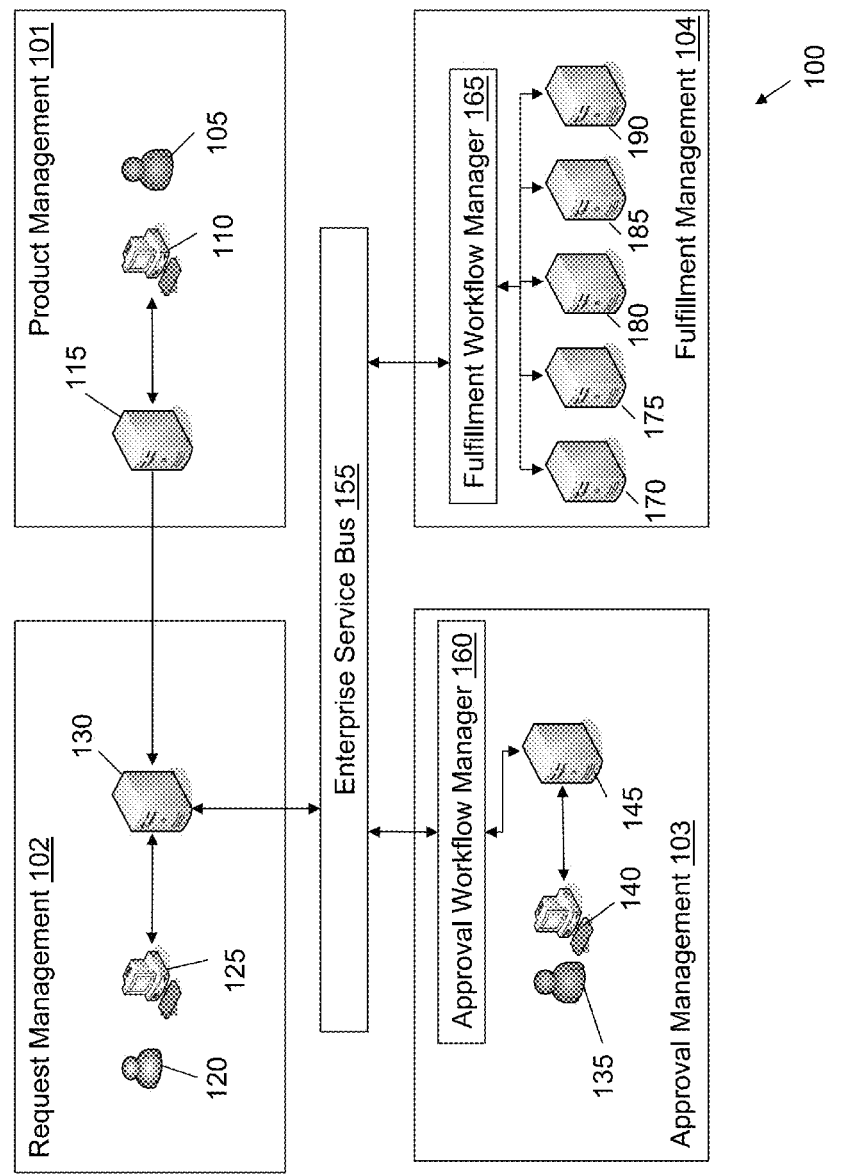
FIG. 1 shows a system architecture according to an exemplary embodiment.

Referring to FIG. 1, a system architecture 100 is shown according to an exemplary embodiment. The system architecture 100 is an exemplary configuration for providing available products or services to a requestor, approving the requested products, and fulfilling the approved order. As described in more detail below, the system architecture 100 has four main components: a product management component 101, a request management component 102, an approval management component 103, and a fulfillment management component 104. These components 101, 102, 103, 104 can act as separate modules on one or more computing devices. In one embodiment, each component 101, 102, 103, 104 is configured to be executed or managed on a single server. Alternatively, each component 101, 102, 103, 104 can be configured to be combined on one or more computing devices or servers. In one example, the approval management component 103 and the fulfillment management component 104 can be embodied on a single server. It is generally intended that the system architecture shown in FIG. 1 is merely exemplary and one of ordinary skill in the art can recognize that the architecture can be configured as long as each of the functions can still be performed.

The system architecture 100 can be established in a company that desires to procure products or services. As described herein, the term "procure" is intended to include the acquisition of products or services upon request and can include the request, purchase order, electronic invoice, billing, and payment for the acquired products or services. Accordingly, the procurement of a product or service can include any or all facets of selecting, purchasing, or obtaining the desired product or service. The procurement can be subject to contractual provisions or independent of a contract. The products can include, for example, consumer goods, electronics, office supplies, and software. The services can include, for example, software licenses, facility services, mobile phone service, creation of an email distribution list, and user account for access to an application. The products or services are likely to include items where, for example, the company can negotiate an annual discount rate for their purchase. The products and services are not likely to include those items where the company must negotiate with a supplier for each purchase, such as purchasing a fleet of cars for the company. However, using the system described, a requestor can request that someone begin negotiation for a product or service, such as a fleet of cars. However, the scope products and services are not limited to any particular products or services and the system can be configured to allow for the procurement of many types of products and services beyond those described herein.

A resource owner 105 can provide information and updates to a product management server 115. The resource owner 105 can be an administrator that is internal or external to the company and is responsible for the content available to the company's employees for procurement. The resource owner 105 has a computing device 110, such as a desktop computer, laptop computer, netbook computer, personal data assistant, or mobile phone. The computing device 110 has a display, a memory, a processor, and access to the product management server 115 through a communication channel, such as a LAN, WAN, or other network connection. In an alternative configuration, the computing device and the product management server can be a single computing device. The resource owner 105 conducts maintenance of and manages the product management server 115 by defining available products and services, setting prices, ensuring proper mapping to workflow, and defining questionnaires. The resource owner 105 uses a content management tool on computing device 110 to determine which products, versions of products, and services to make available to the company employees. If another employee of the company would like to make a certain product or service available, the employee can submit a request to the resource owner 105 describing the requirements of the desired product or service. The resource owner 105 may request from a buying entity to negotiate prices with a vendor and make the negotiated products and services available. The resource owner 105 makes these products and services available by publishing the content on the product management server 115. The resource owner 105 determines what a requestor will be able to view as available. The resource owner 105 has access to all of the products and services in the catalog and can determine whether to make the products or services available or hidden to a particular requestor. As discussed below, the availability can be based upon the requestor's job title or location, or based upon an organizational hierarchy.

The product management server 115 has a catalog that is updated with available products and services from external and internal entities. The external entity can include a supplier or a reseller of the supplier, both of which may be referred to herein as a vendor. The external entity can include, for example, a consumer goods vendor (who can communicate through a website or other electronic communication) or an online shopping website that accesses numerous vendors. Although the external entity may have a contractual relationship with the company to supply or sell products or services, the external entity is not a parent, subsidiary, or other entity that is related to or has a corporate affiliation with the corporate entity of the company. The internal entity can include, for example, an IT department and an office services department that manages supplies and equipment.

The catalog in the request management server 115 can be made available to requestors for procuring products or services. The catalog, which includes both products or services from internal entities and external entities, provides a "marketplace" to the requestor. The marketplace is a single location that presents all available products or services for that particular requestor. The marketplace can be accessible via a graphical user interface and, for example, can be embodied on a web site.

A requestor 120 can be any member of the company, including a fulltime employee, part-time employee, volunteer, or consultant of the organization. The requestor 120 can request these products or services from the catalog on the product management server 115.

The requestor 120 sends a request from a computing device 125, such as a desktop computer, laptop computer, netbook computer, personal data assistant, or cellular phone. The computing device 125 has a display, a memory, a processor, and access to a request management server 130 through a communication channel, such as a LAN, WAN, or other network connection. In an alternative configuration, the computing device and the request management server can be a single computing device.

In addition to determining which content to make available on the system, the resource owner 105 can further limit the available products and services by filtering the content for each requestor. A filter can be applied to the catalog for each requestor 120 and based upon a department level or location of the requestor 120. Accordingly, the requestor 120 can only view products and services available for procurement based upon that requestor's availability settings, as configured by the resource manager 105. The request management server 130 maintains the availability for the company's employees.

In managing access to and visibility of the content, the resource manager 105 enters a business level, location, and/or name of a requesting entity and selects from a predetermined visibility setting or can customize the setting for that type of requestor. Additionally, a resource manager can assign, change, or remove availability settings in the request management server 130 for individuals or groups of employees. Alternatively, the request management server 130 can automatically update employee records based upon "triggers," e.g., changes to an employee's record in human resources.

For example, if Gary in London can view and order products or services, those products or services may not be available to Karen in New York. As a result, when Karen shops the catalog, Karen will not see products or services that Gary is entitled to see based on his department, department level, and/or location. When there are changes to the company's real estate locations, department levels, employment status, or other reorganization, the resource manager's configurations can be synchronized to update the visibility settings for available content.

The product management server 115 provides available content to the request management server 130. The request management server 130 can display some or all of the available content to the requestor 120. The content is displayed to the requestor 120 on the display of the computing device 125 via a graphical user interface, such as a web browser. The availability of content for the particular requestor 120 can be limited by the visibility settings for the requestor 120. The visibility settings determine which content is available or hidden to the requestor 120.

In configuring the visibility settings, each requestor 120 can be assigned to an availability group by the resource owner 105. The requestor's business unit within the company or role within the company can be used to determine the type of availability. For example, a human resources manager may be able to view all products and services, but a secretary may be able to view only hardware and software upgrades. In another example, the available products and services may depend on the type of business unit, such as accounting or information technology. The filter can be configured to include or exclude certain entities. In an exclude mode, the catalog is available to everyone, but the filter excludes a certain organization. For example, employees from a consumer bank cannot request mobile phones from the marketplace.

Figure 2:
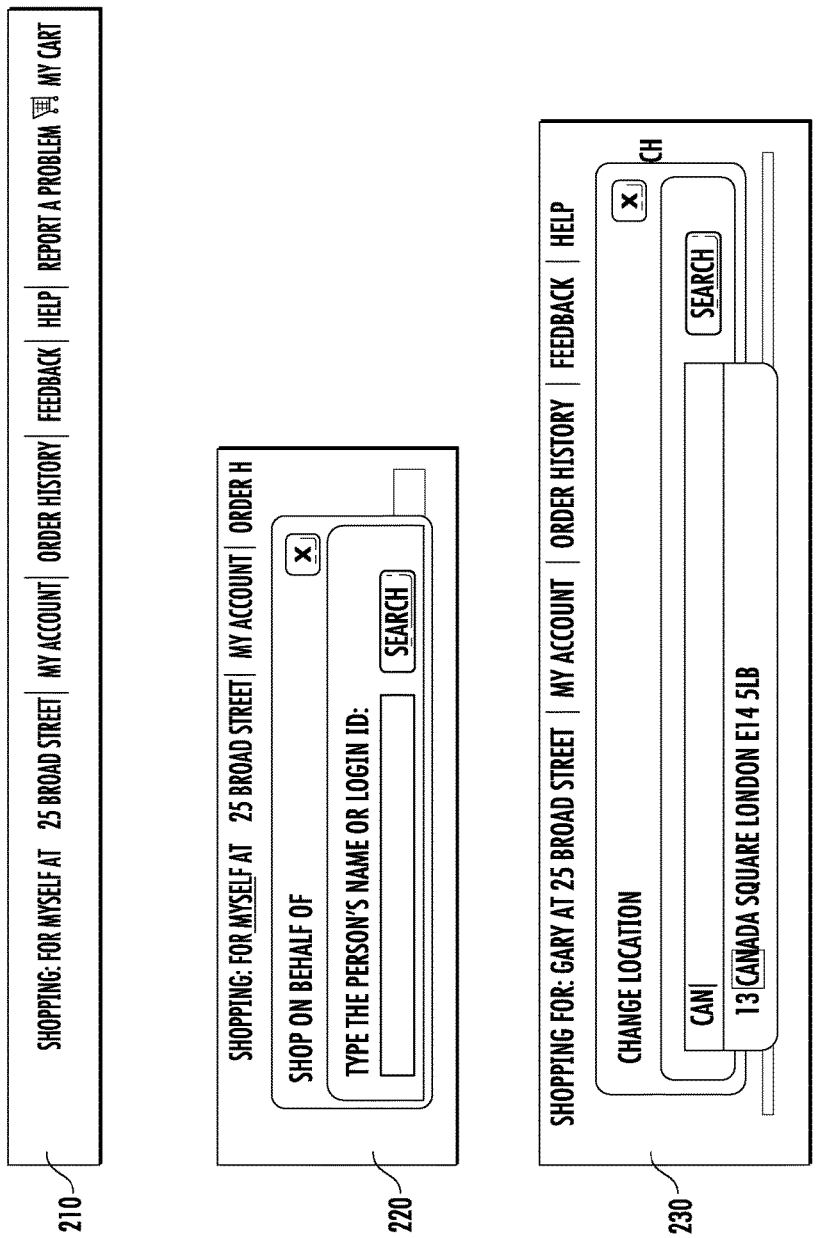
FIG. 2 shows a user interface for allowing a requestor to shop on behalf of another according to an exemplary embodiment.

A requestor can shop on behalf of another entity. Referring to FIG. 2, a requestor has a default setting 210 for the requestor's own department level and location. For example, the default setting may be 25 Broad Street in New York. The requestor can change the setting to shop on behalf 220 of another person or entity. The requestor enters the name in the dialog box. For example, the requestor can shop on behalf of Gary, and so the requestor will enter Gary's name or login identification in the dialog box. In addition or as an alternative, the requestor can change the location 230 for the shopper. As a result, the requestor can request a product or service for another person. The requestor will have access to the available content based on the visibility settings for that person. Also, if the person is located in a different office or uses multiple office locations, the requestor can select the appropriate office, thereby filtering those products or services appropriate for that office. For example, the requestor can enter "3 Canada Square" in London to change the location from "25 Broad Street" in New York. Accordingly, the requestor is now shopping on behalf of Gary in London. As a prerequisite to using this feature, the requestor may need an appropriate permission from a person to shop on their behalf.

At the computing device 125, the requestor 120 can search for a particular product or service in the catalog, browse through available products or services in the catalog, or initiate the procurement of a package of products and services.

When a requestor is shopping to procure products or services in the marketplace, the marketplace is presented to the requestor as a graphical user interface similar to online shopping websites. The requestor can order items by selecting the item and then clicking a button, such as a button labeled "Add to Cart." When the requestor has completed shopping, the requestor can view the contents of the cart to delete or modify the requested items. The user interface will also provide a total price for the requested items. Upon confirmation of the items in the cart by the requestor, a request is sent for approval and/or fulfillment. By using this user interface, a requestor's request for products or services will be properly completed before it can be submitted for approval and/or fulfillment.

When the requestor 120 selects a product or service for procurement, the requestor is directed to a checkout web page. Before fulfillment of the request, however, the request can proceed to an approving entity. Although the exemplary embodiment describes a single approver, it is intended that any number of approvers can be involved in this process. It is also intended that there may be no approval needed for certain products or services, or for requests from certain requestors.

The request from the request management server 130 is transmitted through an enterprise service bus 155 and an approval workflow manager 160 to an approval server 145. An approver 135 has a computing device 140, such as a desktop computer, laptop computer, netbook computer, personal data assistant, or cellular phone. The computing device 140 has a display, a memory, a processor, and access to the approval server 145 through a communication channel, such as a LAN, WAN, or other network connection. In an alternative configuration, the computing device and the approval server can be a single computing device. Although an approval management component 103 is shown, the system 100 is not intended to be limited to only those systems that require approval. Additionally, some requested products and services may require approval whereas other products and services do not require any approval. Also, approval can be performed by any number of approvers, including zero, one, or more than one.

Figure 3:
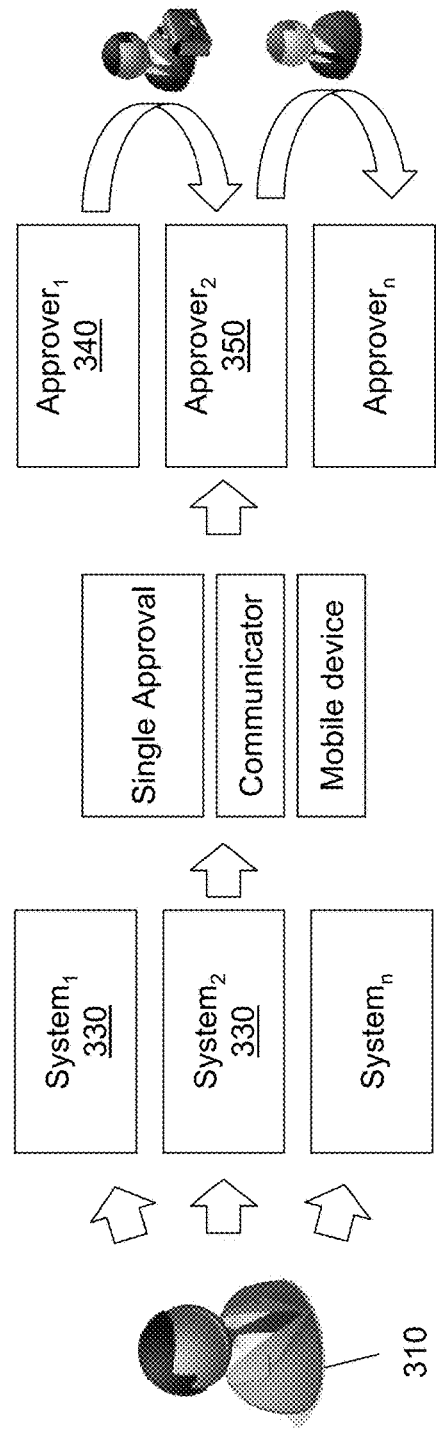
FIG. 3 shows an approval schematic according to an exemplary embodiment.

Referring to FIG. 3, an approval schematic is shown according to an exemplary embodiment. A requestor 310 can request a product or service that must undergo approval before fulfillment. In this exemplary embodiment, the requestor 310 is requesting more than one product or service, though it is not intended to be limited to the approval process for more than one product or service and can be applied to a single product or service request. Alternatively, the request may be a zero-step approval, i.e., no approval is required before fulfillment. The requestor 310 can submit a first request on a first system 320, such as for a marketing application. The requestor can also submit a second request on a second system 330, such as for a banking system. The systems can include any varying framework, infrastructure, software, or other configuration where the processes differ for approval based upon the type of product or service requested. The requests for all systems, including systems 320, 330, can be processed together as a single approval, depending upon the type of approval. The approval system can include any number of systems for a central approval. In one example, the system 320 can be the marketplace described herein. When approver reviews their inbox for pending approvals, those requests can originate from any number of different systems. The approval model determines who approves a particular request. For example, an approval that requires incurring an expense may be sent to a financial approver. In contrast, an approval that gives the requestor access to a corporate information system (e.g., Microsoft Office) may be sent to a manager. These types of approvals may be based upon a hierarchy, where the request is automatically delivered for approval to the next highest ranking employee presiding over the requestor. If the requestor 310 submits multiple requests for a manager 340, then the manager 340 will receive all of the requests together. These requests can be delivered to the manager 340 via e-mail or on an application on a mobile device. The manager 340 will be presented with a single list of pending approvals to approve. If the request requires additional approval, the request can then be provided to a second approver 350 for approval.

The approver may approve the request in part or in its entirety. Alternatively, the approver may suggest a different version of the requested product or services. For example, the approver may suggest a newer version of a software license so that the requestor's software is compatible with the software used by others in the company. The approver can also deny the request in part or in its entirety. The approver can also suggest a lower cost or free version of the software.

Once the request is approved, the approved request is sent for fulfillment. The approved request is transmitted from the approval server 145 to the approval workflow manager 160, which directs the approved request through the enterprise service bus 155 to the fulfillment workflow manager 165. The fulfillment workflow manager 165 can fulfill the request using a plurality of modules, which can be embodied on one or more servers. These modules can offer different types of fulfillment for various products and services. Examples of these products and services include, but are not limited to, messaging for email and distribution lists, and infrastructure management systems that can provide IP addresses, virtual servers, remote access services, and virtual desktops. In the exemplary embodiment, these modules are shown as separate servers, though it is intended that one or more of these modules can be embodied on a single server and that multiple modules can be combined into a single module. Each module is a software product or programming code executed by a processor on a server.

An inventory allocation module 170 determines if a product or service is available internally before purchasing the product or service from an external vendor. The inventory allocation module automatically performs this determination for each request for a product or service. For example, the company may purchase 200 software licenses and include those licenses in the inventory. The list of licensed users can then be added and subtracted accordingly. If the product or service is available internally, then the product or service can be allocated to the requestor 120. For example, if the requestor 120 requests software, the inventory allocation module 170 may determine that ten licenses remain available for that software. The amount of available licenses would be decremented and the requestor 120 would be given access to the software.

A security module 175 handles approved requests for applications that require access control. Accordingly, when the security module 175 receives the request, the security module 175 can coordinate with an access control list database to add, remove, or change the access control list for a particular product or service. For example, if a trader wants access to a trading application, then the security module 175 can coordinate with the appropriate security systems and create a trading account for the requestor.

A desktop software module 180 receives requests from the fulfillment workflow manager 165 relating to software for a desktop computer. The desktop software module 180 can initiate the purchasing of the software if the inventory allocation module 170 indicates that the requested software is not available internally. The desktop software module 180 can also initiate the installation of the software on the requestor's desktop or laptop computer.

A mobile module 185 receives requests from the fulfillment workflow manager 165 for purchasing a mobile phone and/or service. The mobile module 185 can interface with the mobile phone enterprise infrastructure (not shown) to configure the mobile phone, including the ability to erase settings and applications, modify settings, add and remove applications, change a password, and select a requested service plan.

Optionally, a procurement module 190 purchases a product or service from a vendor if the product or service is not available in internal inventory. The procurement module 190 sends a purchase order to the vendor. The vendor supplies the product or service and sends a bill to that can be paid electronically.

The fulfillment of one or more products or services can be configured to handle three types of scenarios: automatically, where all tasks are completed electronically by automated provisioning engines; manually, where all tasked are handled by a human; or by using a combination of automated and manual provisioning. In an example of automatic provisioning, the system can automatically check an inventory for software and then deploy that software to the requestor's desktop computer. In an example of manual provisioning, where automated provisioning engines are not available, the fulfillment process may be configured to coordinate one or more tasks to be handled by a human, either in parallel or serial order. For example, an automated system might not exist to check the availability of office supplies, so the fulfillment agent, a human, would physically check the supplies and then the fulfillment agent or a different entity, all human, would then deliver the supplies to the requestor. In an example using both automated and manual provisioning, a requestor may request access to a BLOOMBERG account. A fulfillment agent can manually check for proper pricing of the account, but the request may then proceed to automated provisioning to create the account and permission the requestor with features of the account. Additionally, when more than one product or service is to be fulfilled, the system can appropriately route the fulfillment requests to the proper entities. For example, the system can recognize that a first requested product (e.g., supplies) is to be routed to a fulfillment agent for manual provisioning, but a second requested product (e.g., software) can be automatically provisioned. The fulfillment engine can also be used to automatically, manually, or using a combination of automated and manual procedures to remove a product or service. For example, an item can be returned to inventory when an employee leaves the company.

Figure 4:
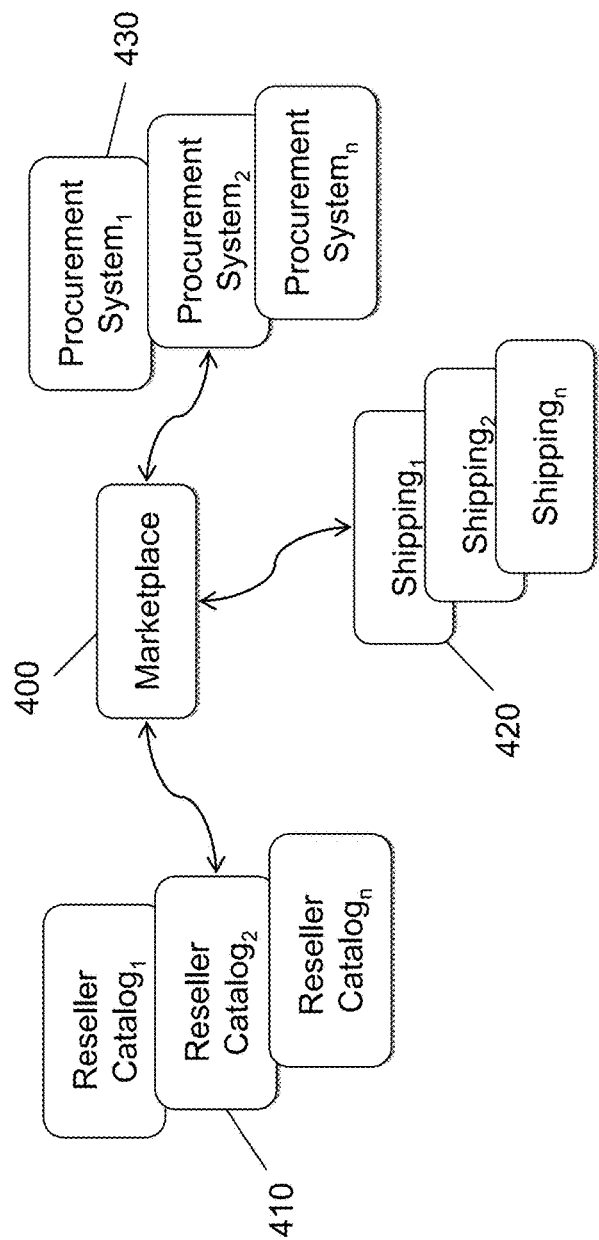
FIG. 4 shows a framework according to an exemplary embodiment.

FIG. 4 shows an exemplary framework according to an exemplary embodiment. A marketplace 400 has access to a plurality of reseller or supplier catalogs 410 for supplying a product or service and providing those catalogs 410 as a single catalog to a requestor. The products and services available in the marketplace 400 can also be configured with various shipping features 420 negotiated by the company and procurement systems 430 depending on the requested product or service. The internal and external products and services available in the marketplace 400 can be updated continuously, periodically, or upon a request. The catalog can be updated for availability, description, version number, price, shipping terms, discounts, or other attributes.

The attributes of the catalog can be synchronized with the vendor catalog. In order to update the catalog, the resource manager can initiate a connection or the product management server can connect to a vendor's website or other electronic service to synchronize the catalog to match products and their qualities, such as price, description, and image. The synchronization can be performed manually or automatically. In one configuration, the catalog can be updated whenever the vendor updates their respective catalog. The update can be sent to the product management server for appropriate synchronizing. In another configuration, the catalog can be updated on a periodic basis, such as once a week. For example, each week, the product management server can request and/or receive updates from the supplier or reseller for products or services in the catalogs. In yet another configuration, the resource owner can request an update for some or all of the catalog. In another configuration, the updating of the catalog can be performed automatically by the product management server.

Figure 5:
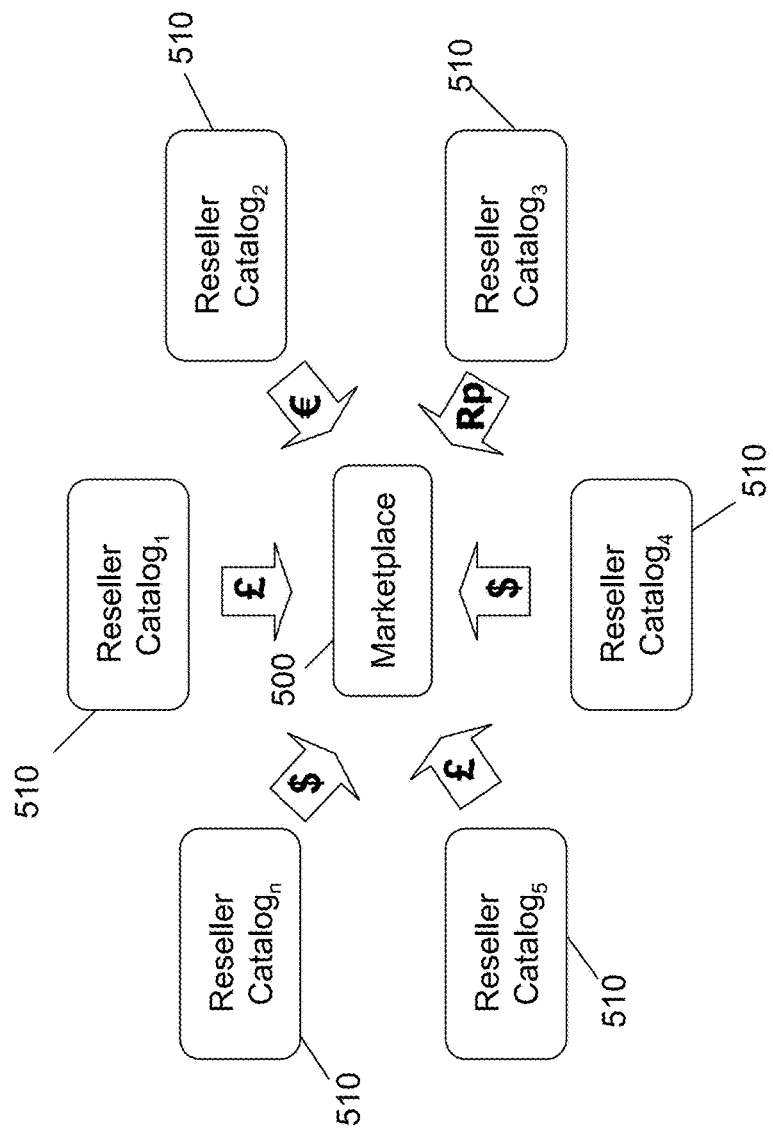
FIG. 5 shows a multi-currency pricing framework according to an exemplary embodiment.

Referring to FIG. 5, a multi-currency pricing framework is shown according to an exemplary embodiment. A marketplace 500 can provide products and services from a plurality of supplier or reseller catalogs 510 having a plurality of currencies. The marketplace 500 can also provide prices for products and services to a requestor where the reseller catalog provides that price in a different currency. The system can convert the currency to the requestors currency based upon current exchange rates and display only prices in the requestors currency. For example, if the requestor is shopping in U.S. dollars, the marketplace can provide products and services from Reseller Catalog$_1$, which provides the prices in British pounds, and show those products and services in terms of U.S. dollars. In an alternative embodiment, the framework also allows catalogs to communicate with the marketplace in a plurality of different languages. In one example, an English-speaking requestor can view products and services available in different languages, but all presented in English. In another example, even though the requestors use the catalog in their respective languages, the system can be managed by a resource manager or other administrator in a single language.

Purchases can be batched before generating a purchase order. For example, a company may have negotiated an agreement with a supplier to buy a particular product, such as a computer, at a first price, but the company will pay a lower, second price if the company purchases a certain quantity. As a result, when a requestor receives approval to purchase that product, the system may wait until a minimum number of products have been requested before generating the purchase order for these products in a batch at the lower, second price.

Figure 6:
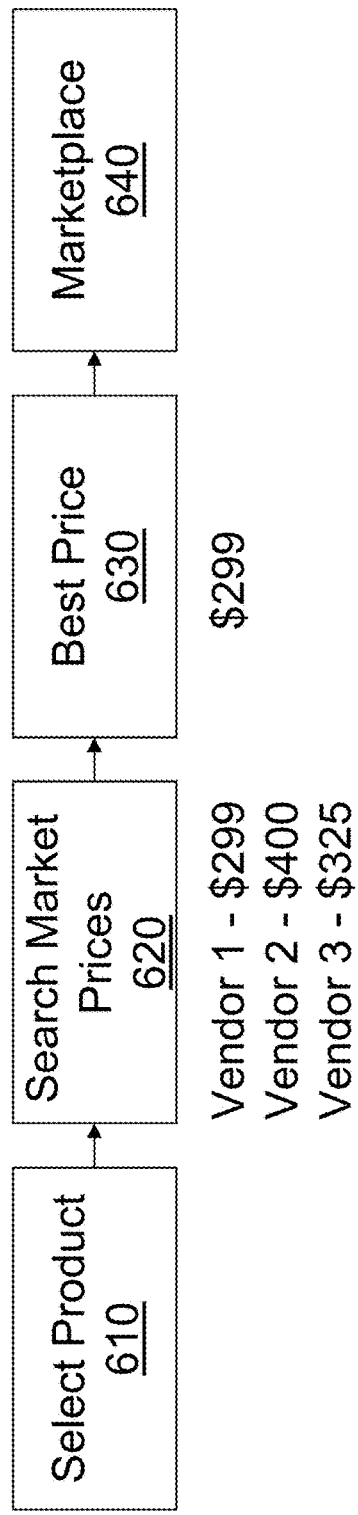
FIG. 6 shows a pricing engine according to an exemplary embodiment.

Referring to FIG. 6, a pricing engine is shown according to an exemplary embodiment. When a requestor selects a product from the marketplace, a pricing engine provides the best available price for that product. A product is selected 610 by the requestor. Using a product name, universal product code, product serial number, or other product identifier, the pricing engine searches for prices for that product. The pricing engine can search internal and external catalogs for the best price of the product or service, which can be based upon negotiated agreements, available vendors, and other factors that affect the listing and pricing of items in the marketplace. The pricing engine can also search online vendors and retailers for the product. When identifying suppliers of the product, the pricing engine identifies prices for that product 620. For example, the pricing engine can identify three vendors that sell the product at $299, $400, and $325. The pricing engine selects the best price 630. In the example, the pricing engine selects $299, the best price of the three vendors. The product is then presented in the marketplace 640 to the requestor using that price. As a result, although numerous vendors may provide that product, the requestor will only see the lowest available price.

The pricing engine can also perform pricing analytics. The pricing engine can analyze prices from external vendor catalogs, including both vendors who are contracted to do business with the buying entity and those who are not contracted to do business with the buying entity. The pricing engine may compare prices and terms for like products and services to identify where non-contracted vendors provided a better price. The results can be used for future negotiations, as the "visibility" enables an organization's buyers to provide evidence of better prices to another organization's selling agents.

Figure 7:
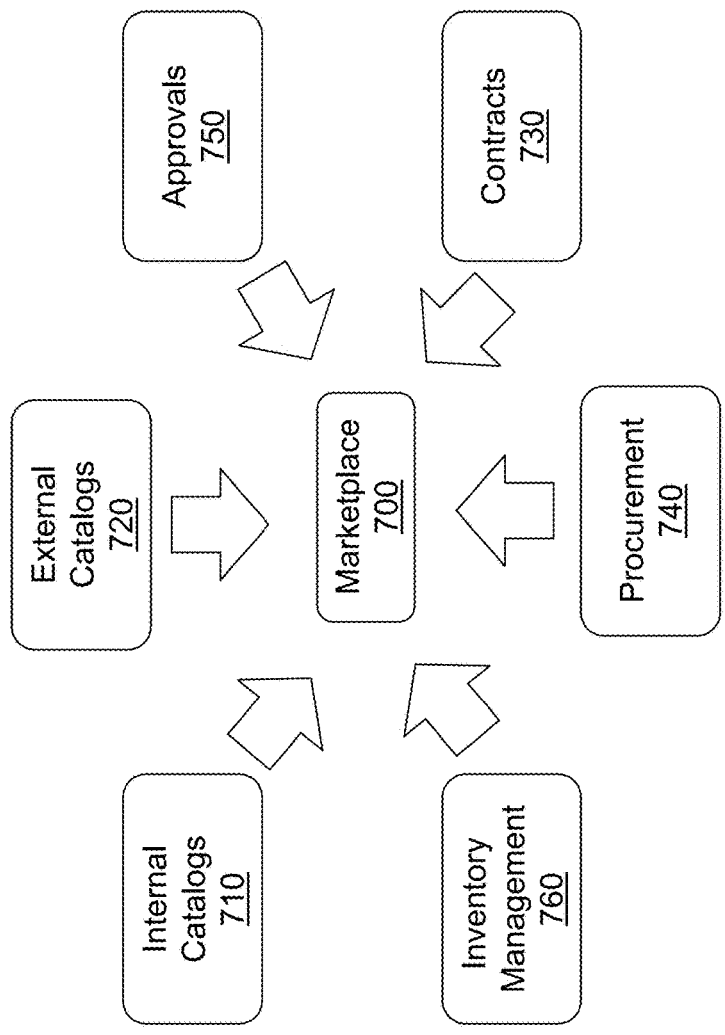
FIG. 7 shows a procurement engine according to an exemplary embodiment.

Referring to FIG. 7, a procurement engine is shown according to an exemplary embodiment. A marketplace 700 incorporates product information and streamlines internal processes in a single system. The marketplace provides products and services from internal catalogs 710 as well as external catalogs 720. The products and services reflect the terms of contracts 730 between the company and a supplier or reseller. Procurement 740 can re-use products, such as by obtaining a product from inventory instead of making a purchase. The approval 750 process at the company is also integrated into the marketplace 700. The marketplace also integrates inventory management 760, so that existing inventory can be checked before making a purchase.

Figure 8:
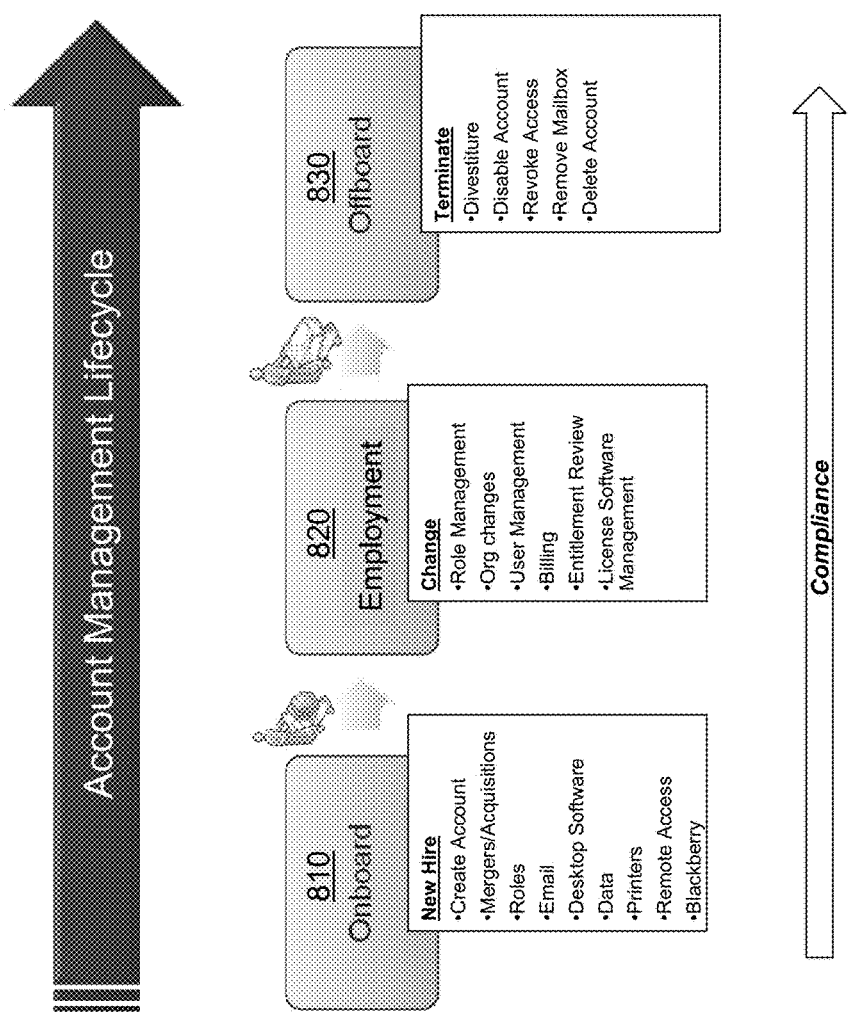
FIG. 8 shows an account management lifecycle according to an exemplary embodiment.

Referring to FIG. 8, an account management lifecycle is shown according to an exemplary embodiment. When a new employee is hired 810 by a company, the company procures products and services for the new employee, such as e-mail service, desktop software, and a printer. An employee can change status during employment 820 within the company. As a result, the employee may need access to new products or services, such as billing software. When an employee leaves 830 the company, the company must terminate the services, such as e-mail service, and return the products to the supplier or to inventory for reuse. The system described herein can manage the procurement and change of products and services throughout the lifecycle of an employee's account. When provisioning an employee to a product or service, the employee is given access to that product or service. This system can interact with the necessary provisioning systems or a security access list to add, modify, or remove the access. Accordingly, the system can act as middleware to communicate with email, directory services, or security systems, such as Microsoft exchange, Microsoft active directory, Unix or mainframe or other provisioning system.

Figure 9:
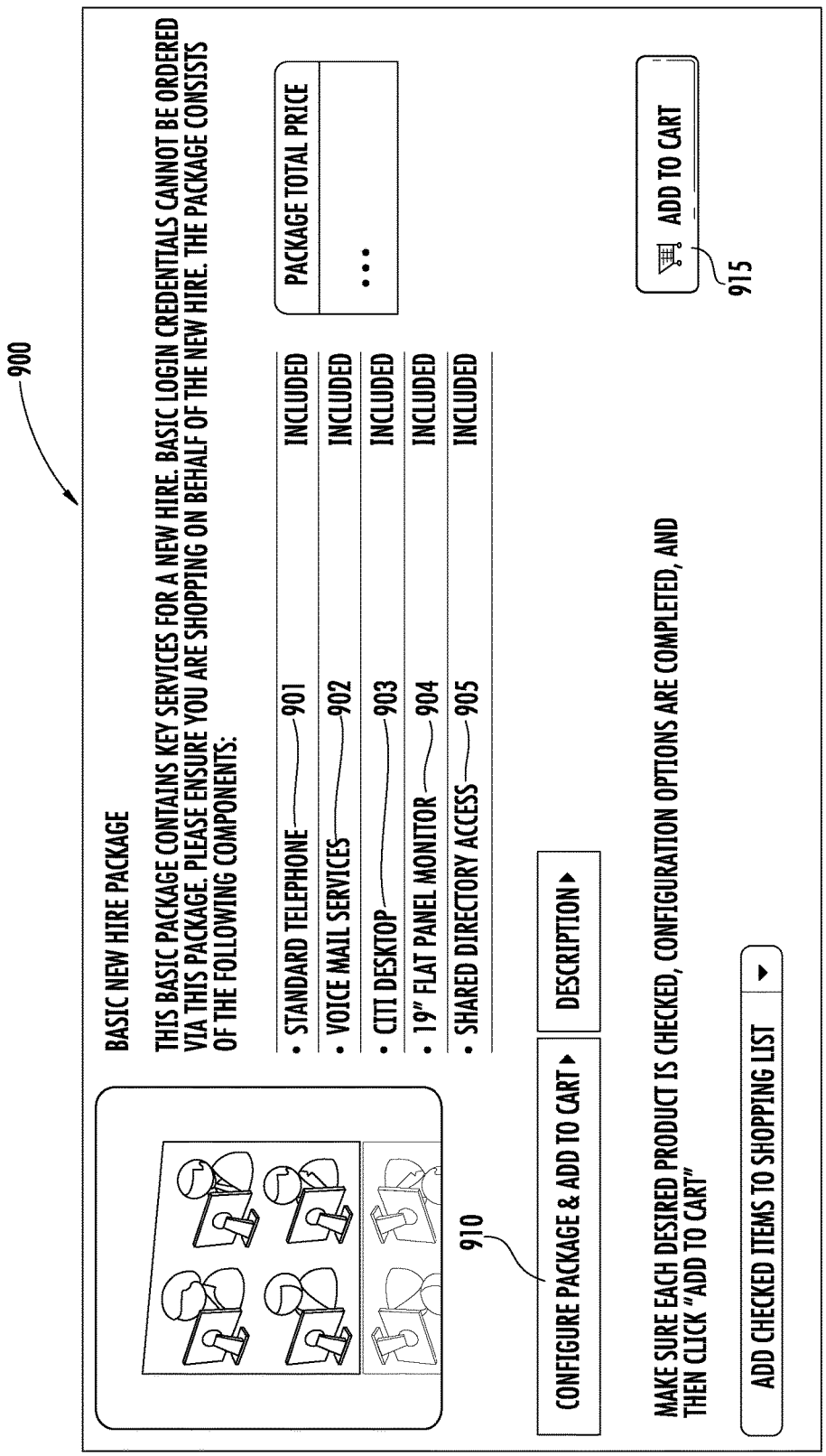
FIG. 9 shows a new hire package according to an exemplary embodiment.

Referring to FIG. 9, a new hire package 900 is shown according to an exemplary embodiment. When hiring a new employee, a human resources manager can simultaneously procure multiple products and services related to the employee's job function. Rather than separately ordering products and services from various suppliers and internal departments of the company, the human resources manager can add a "new hire" package 900 for procurement in the marketplace. The package 900 can include, for example, an order for a standard telephone 901, voice mail services 902, desktop computer 903, monitor 904, and shared directory access 905. The human resources administrator can also configure the package 910 to add, delete, or modify the default items. Once the package is added to the cart 915 and the human resources manager confirms the package, the procurement can proceed to approval and/or fulfillment.

Figure 10:
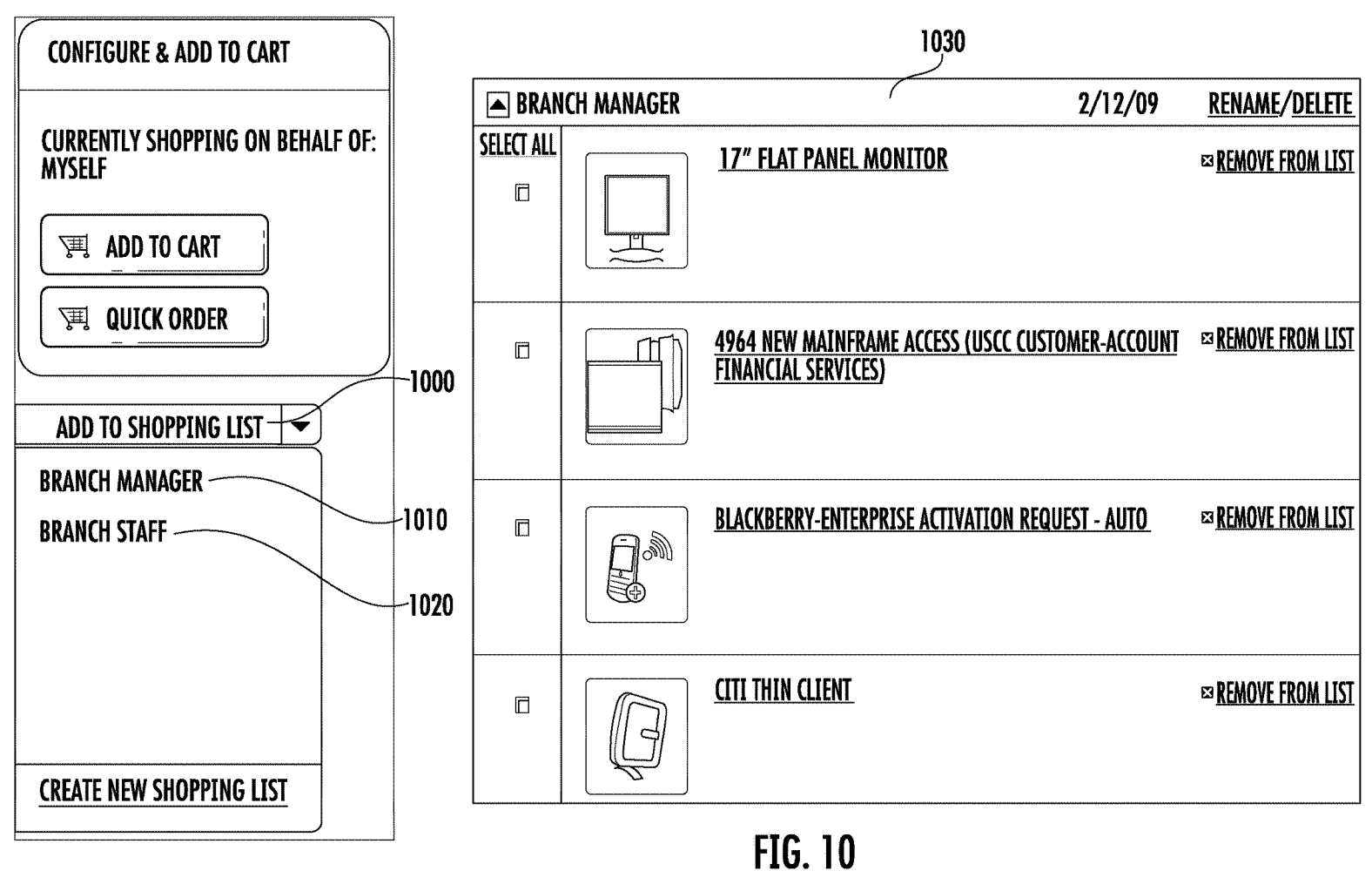

Referring to FIG. 10, a shopping list user interface is shown according to an exemplary embodiment. In one example, a requestor can create a shopping list for commonly ordered items. In another example, a requestor can create a shopping list to bundle products and services, so that the requestor does not need to separately select each product for the next order. In yet another example, a shopping list may be used to add new products and services for a new hire. A requestor can add an employee function to the shopping list for easily procuring all items required for the new employee having that function. For example, the requestor has a shopping list 1000 for a branch manager 1010 and a branch staff member 1020. For the branch manager 1010, the user interface provides a list 1030 of products and services for that job function. Accordingly, when a branch manager is hired, the requestor can add "Branch Manager" 1010 to the shopping list 1000, which will result in the default items for the branch manager to be selected. The requestor can proceed with procuring these products and services. The requestor can re-use the shopping list for another employee. The requestor can also submit bulk orders based upon this shopping list.

Figure 11:
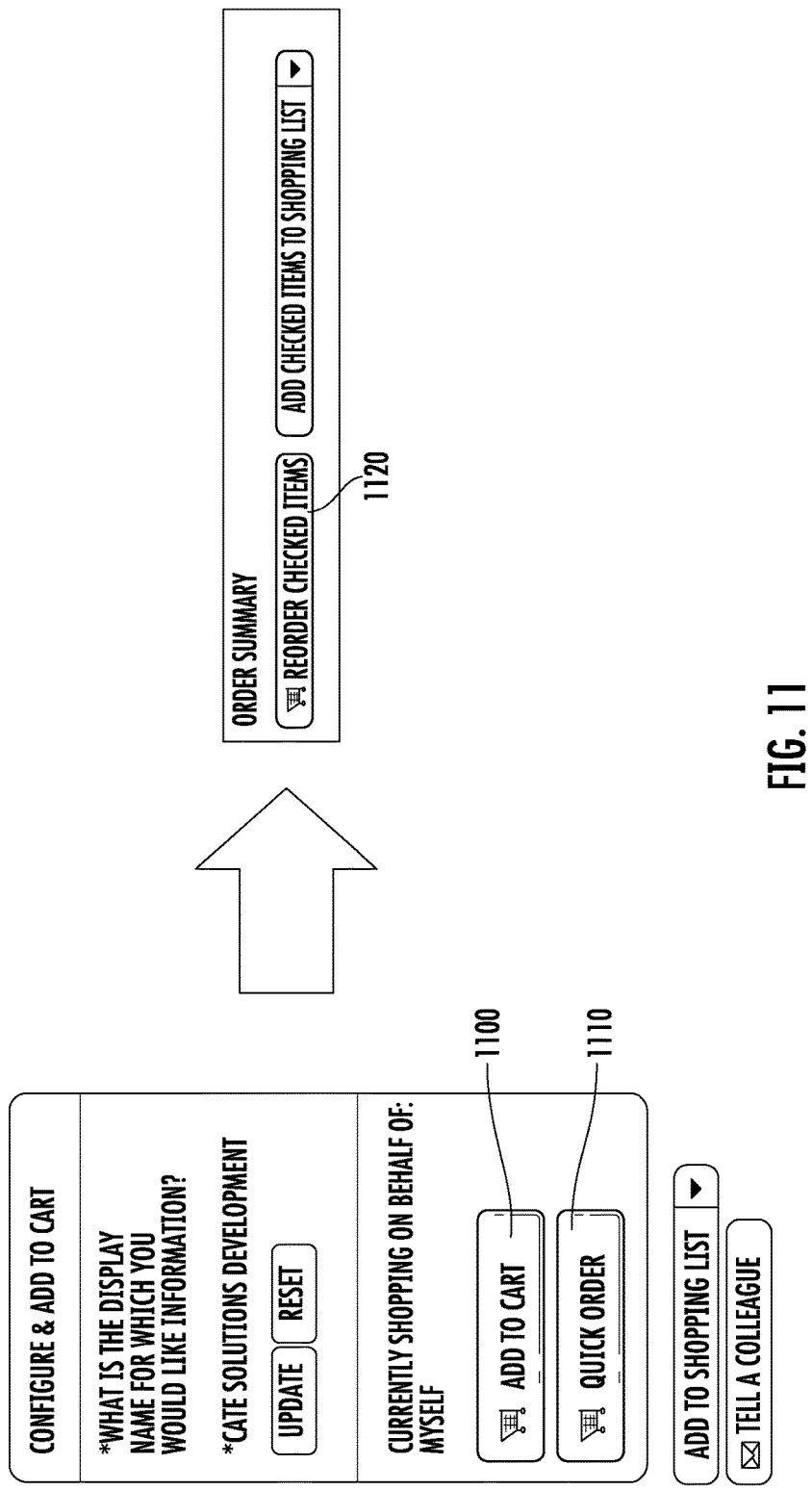
FIG. 11 shows a quick order and re-order feature according to an exemplary embodiment.

Referring to FIG. 11, a quick order and re-order feature is shown according to an exemplary embodiment. When a requestor selects a product or service, the requestor can choose to "Add to Cart" 1100, where the items are place in the cart for later review and confirmation. Alternatively, the requestor can select "Quick Order" 1110, whereby the items are sent directly for approval and/or fulfillment. When the requestor selects "Quick Order" 1110, the requestor bypasses checkout and does not have an opportunity to review the items in the cart. The requestor can also reorder checked items 1120. At the order summary, the requestor can view all items that have been just ordered. The requestor can select some or all of the items for reorder. For example, if the requestor orders five items for a first employee, the requestor can "reorder" three of the five items for a second employee by checking off those items at the order summary and selecting "reorder checked items" 1120.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method for requesting a product or service, the method comprising:

receiving, by a request management server, from a requestor computer associated with a requestor of a corporate entity one or more requests, each request identifying one or more records of products or services stored in one or more databases, wherein a request instructs the request management server to generate one or more catalog user interfaces configured to display data associated with the products or services stored in the one or more databases, the data representing at least one product or service, and wherein the one or more databases storing the data includes at least one of: a first database having an internal inventory of the corporate entity and a plurality of databases affiliated with external vendors from a product management server;

identifying, by the request management server, in at least one of the first database and a second database that is affiliated with an external vendor at least one record containing data representing the at least one product or service, wherein each of the least one record is identified based upon a business unit of the requestor in the corporate entity and a location of the requestor, generating, by the request management server, a first catalog user interface configured to display the data representing the at least one product or service identified in the at least one of the first database and the second database at a browser of the requestor computer of the corporate entity, wherein the first catalog user interface comprises a plurality of identifiers associated with each of the at least one product or service displayed at the browser via the first catalog user interface;

upon receiving from the requestor computer via the browser a selection of a identifier associated with at least one product or service:

generating, by the request management server, a checkout web page for presentation on the browser of the requester computer and an approval request message configured for an approver computer comprising data representing the selection from the requestor computer via the first catalog user interface;

procuring by a fulfillment management server, the request management server, the product or service for the requestor upon receiving an approval confirmation from the approval server based on the approval request to the approval server, wherein procuring comprises acquiring a software license for the requester's computer and automatically installing the software license on the requestor's computer; and automatically configuring, a mobile phone, by a mobile module that interfaces with the mobile phone enterprise infrastructure that is included in the fulfillment management component of the request management server, wherein the configuring includes the ability to erase settings and applications, modify settings, add and remove applications, change a password, and select a requested service plan.

2. The computer-implemented method according to claim 1, further comprising synchronizing a filtered catalog with at least one of the plurality of databases, wherein the filtered catalog comprises the at least one record containing the data representing the at least one product or service.

3. The computer-implemented method according to claim 2, further comprising updating a quality of a product or service in the filtered catalog with a new quality from at least one of the plurality of databases.

4. The computer-implemented method according to claim 3, wherein the updating occurs on a periodic basis.

5. The computer-implemented method according to claim 3, wherein the updating occurs when at least one of the plurality of databases has a new quality of the product or service.

6. The computer-implemented method according to claim 2, wherein presenting the filtered catalog to the requestor comprises providing only a product or service that is designated as visible to the requestor.

7. The computer-implemented method according to claim 2, wherein the catalog includes a product or service subject to a contract between an external vendor and the corporate entity.

8. A system comprising:
one or more databases storing data in records for one or more products or services, the one or more databases including at least one of: a first database having an internal inventory of a corporate entity and a plurality of databases affiliated with external vendors, a request management server for receiving one or more requests from a requestor computer of the requestor, each request identifying one or more records of products or services stored in the one or more databases, wherein a request instructs the request management server to generate: one or more catalog user interfaces configured to display data associated with the products or services stored in the one or more databases, identify in at least one of the first database and a second database that is affiliated with an external vendor at least one record containing data representing the at least one product or service, wherein each of the least one record is identified based upon a business unit of the requestor in the corporate entity and a location of the requestor, generate a first catalog user interface configured to display the data representing the at least one product or service identified in the at least one of the first database and the second database at a browser of the requestor computer of the corporate entity wherein the first catalog user interface comprises a plurality of identifiers associated with each of the at least one product or service displayed at the browser via the first catalog user interface, and generate a checkout web page upon the requestor computer selecting an identifier associated with the at least one product or service;

an approval server configured to receive from the requestor computer via the browser an approval request initiated upon a selection by the requestor computer of an identifier associated with a product or service, via the first catalog user interface;

a fulfillment server configured for procuring the product or service for the requestor upon receiving the approval confirmation from the approval server, wherein the fulfillment server is configured to acquire a software license for the requester's computer, and wherein the software license is automatically installed on the requester's computer; and the fulfillment management server further includes a mobile module that interfaces with the mobile phone enterprise infrastructure to configure automatically a mobile phone, wherein the configuring includes the ability to erase settings and applications, modify settings, add and remove applications, change a password, and select a requested service plan.

9. The system according to claim 8, wherein a catalog comprises the at least one record containing the data representing the at least one product or service from an external vendor.

10. The system according to claim 9, wherein the catalog comprises internal products and services.

11. The system according to claim 9, further comprising a database coupled to the product management server for storing visibility settings, wherein the visibility settings determine which products or services from the catalog are available to the requestor.

12. The system according to claim 8, wherein the fulfillment server is configured to determine whether the requested product or service is available internally.

13. The system according to claim 11, wherein the fulfillment server is configured to adjust an access control list.

14. The system according to claim 8, wherein the fulfillment server is configured to purchase the requested product or service from an external vendor.

15. The system according to claim 8, wherein the fulfillment server is configured to provide a product or service selected from a group consisting of an email list, a distribution list, an IP address, a virtual servers, a remote access service, and a virtual desktop.

16. A computer-implemented method comprising:
receiving, by a request management server, from a requestor computer associated with a requestor of a corporate entity one or more requests, each request identifying one or more records of products or services stored in one or more databases comprising an internal inventory, an internal database, or a plurality of external vendor databases, wherein a request instructs the request management server to generate one or more catalog user interfaces configured to display data associated with the products or services stored in the one or more databases, the data representing at least one product or service wherein the one or more databases storing the data includes at least one of: a first database having an internal inventory of the corporate entity and a plurality of databases affiliated with external vendors from a product management server;

identifying, by the request management server, in at least one of the first database and a second database that is affiliated with an external vendor at least one record containing data representing the at least one product or service, wherein each of the least one record is identified based upon a business unit of a requester in the corporate entity and a location of the requestor;

generating, by the request management server, a first catalog user interface configured to display the data representing the at least one product or service identified in the at least one of the first database and the second database at a browser of the requestor computer of the corporate entity, wherein the first catalog user interface comprises a plurality of identifiers associated with each of the at least one product or service displayed at the browser via the first catalog user interface;

upon receiving from the requestor computer via the browser, a selection of an identifier associated with at least one product or service, generating, by the request management server, a checkout web page for presentation on the browser of the requester computer and an approval request message configured for an approver computer comprising data representing the selection from the requestor computer via the first catalog user interface;

upon submitting an approval request, receiving an approval confirmation from an approving party for the requestor to obtain the requested product or service;

transmitting, by the request management server, to the user interface of the requestor computer, data from a record of a lower cost version of a version of the requested product or service of the product or service from a different vendor of that requested product or service, upon identifying the record of the lower cost version of the comparable product or service;

procuring, by the request management server, the lower cost version of the comparable product or service for the requestor, wherein procuring comprises acquiring a software license for the requestor's computer and automatically installing the software license on the requestor's computer; and automatically configuring, a mobile phone, by a mobile module that interfaces with the mobile phone enterprise infrastructure that is included in the fulfillment management component of the request management server, wherein the configuring includes the ability to erase settings and applications, modify settings, add and remove applications, change a password, and select a requested service plan.

17. The method according to claim 16, further comprising receiving a new quality of a product or service from an external vendor, wherein the quality is selected from the group consisting of price, description, and image.

18. The method according to claim 16, further comprising receiving a plurality of prices for a product or service from a plurality of external vendors and presenting the lowest price to the requestor.

19. The method according to claim 16, further comprising presenting the available product or service from the filtered catalog to a second user that is shopping on behalf of the requestor.

20. The method according to claim 16, further comprising presenting the available product or service only if the product or service is available to the requestor at a certain location.

21. The method according to claim 16, further comprising automatically requesting a plurality of products or services based upon a change in employment status of an individual.

22. The method according to claim 16, further comprising procuring an order for a requested product or service only after a threshold amount of that product or service has been requested.

23. The method according to claim 16, further comprising automatically determining whether the requested product or service is available internally before ordering the product or service from an external vendor.

* * * * *